(12) United States Patent
Michaux

(10) Patent No.: US 10,124,929 B1
(45) Date of Patent: Nov. 13, 2018

(54) STORAGE CADDY SYSTEM

(71) Applicant: Cara Michaux, E Fayetteville, NC (US)

(72) Inventor: Cara Michaux, E Fayetteville, NC (US)

( * ) Notice: Subject to any disclaimer, the term of this patent is extended or adjusted under 35 U.S.C. 154(b) by 0 days.

(21) Appl. No.: 15/671,594

(22) Filed: Aug. 8, 2017

(51) Int. Cl.
| | |
|---|---|
| *A47K 11/02* | (2006.01) |
| *B65D 25/22* | (2006.01) |
| *B65D 25/04* | (2006.01) |
| *A47K 17/02* | (2006.01) |

(52) U.S. Cl.
CPC .............. *B65D 25/22* (2013.01); *A47K 11/02* (2013.01); *A47K 17/026* (2013.01); *B65D 25/04* (2013.01)

(58) Field of Classification Search
CPC ....... B65D 25/22; A47K 11/02; A47K 17/026
USPC ...................................... 4/449, 480
See application file for complete search history.

(56) References Cited

U.S. PATENT DOCUMENTS

| | | | |
|---|---|---|---|
| 5,529,260 A | 6/1996 | Wirick | |
| 5,662,396 A | 9/1997 | Reeder et al. | |
| D393,387 S * | 4/1998 | Gregor | ........................... D6/513 |
| D424,668 S | 5/2000 | Dangervil | |
| D427,829 S | 7/2000 | Fleming | |
| 6,305,035 B1 * | 10/2001 | Morris | ................... A47K 10/40 |
| | | | 242/588 |
| 7,438,194 B2 | 10/2008 | Wang | |
| 7,779,489 B2 | 8/2010 | Finell | |
| D707,465 S * | 6/2014 | Hutchins | ........................ D6/523 |
| 9,095,222 B2 | 8/2015 | Asaf et al. | |
| 2005/0132485 A1 | 6/2005 | Buggs | |
| 2008/0012257 A1 | 1/2008 | Cregg | |

* cited by examiner

*Primary Examiner* — Huyen Le

(57) ABSTRACT

A storage caddy system includes a portable toilet that is selectively mounted for defecation and urination. The portable toilet has a frame and the frame has a pair of arm rests. A caddy is removably coupled to the portable toilet to contain toiletry items. The caddy is positioned on a selected one of the arm rests such that the caddy is accessible during defecation and urination. A box is positioned within the caddy and the box is elongated to accommodate a roll of toilet paper. A saddle is coupled to the caddy. The saddle receives the selected arm rest such that the caddy is removably retained on the selected arm rest.

8 Claims, 3 Drawing Sheets

STORAGE CADDY SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to caddy devices and more particularly pertains to a new caddy device for storing toiletry items on a portable toilet.

BRIEF SUMMARY OF THE INVENTION

An embodiment of the disclosure meets the needs presented above by generally comprising a portable toilet that is selectively mounted for defecation and urination. The portable toilet has a frame and the frame has a pair of arm rests. A caddy is removably coupled to the portable toilet to contain toiletry items. The caddy is positioned on a selected one of the arm rests such that the caddy is accessible during defecation and urination. A box is positioned within the caddy and the box is elongated to accommodate a roll of toilet paper. A saddle is coupled to the caddy. The saddle receives the selected arm rest such that the caddy is removably retained on the selected arm rest.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
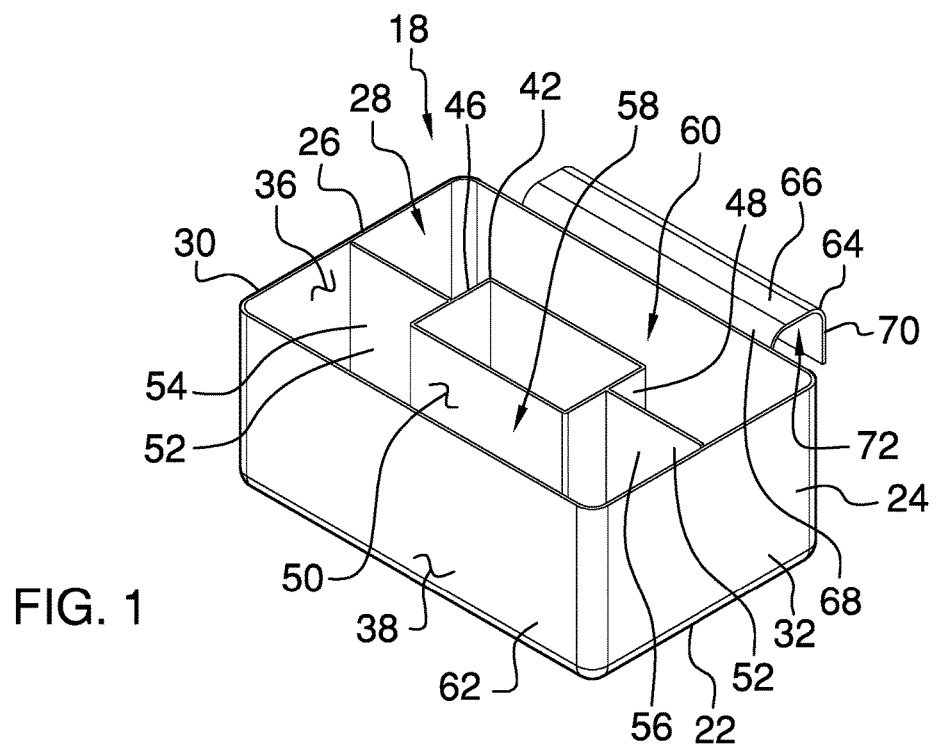
FIG. 1 is a top perspective view of a caddy of a storage caddy system according to an embodiment of the disclosure.
Figure 2:
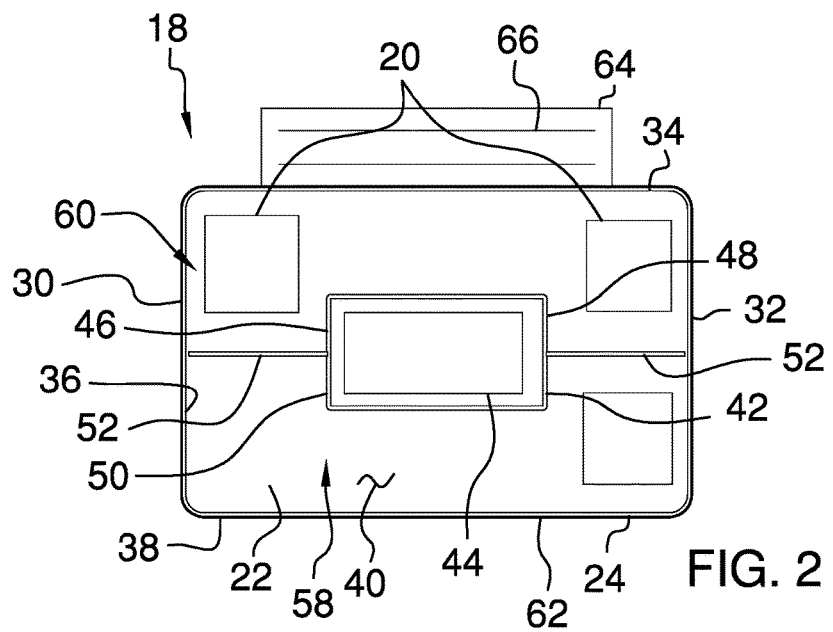
FIG. 2 is a top view of a caddy of an embodiment of the disclosure.
Figure 3:
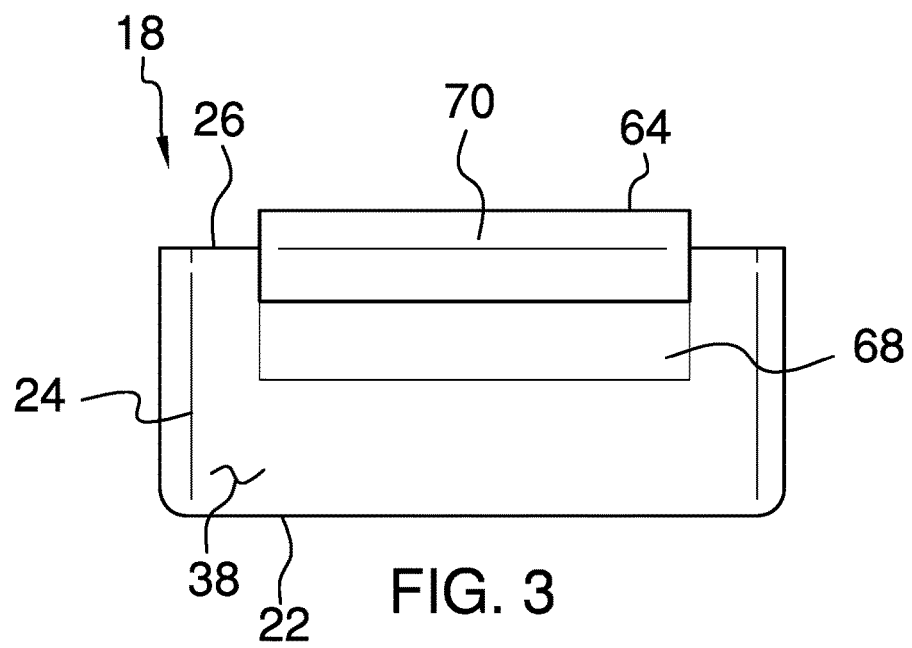
FIG. 3 is a back view of a caddy of an embodiment of the disclosure.
Figure 4:
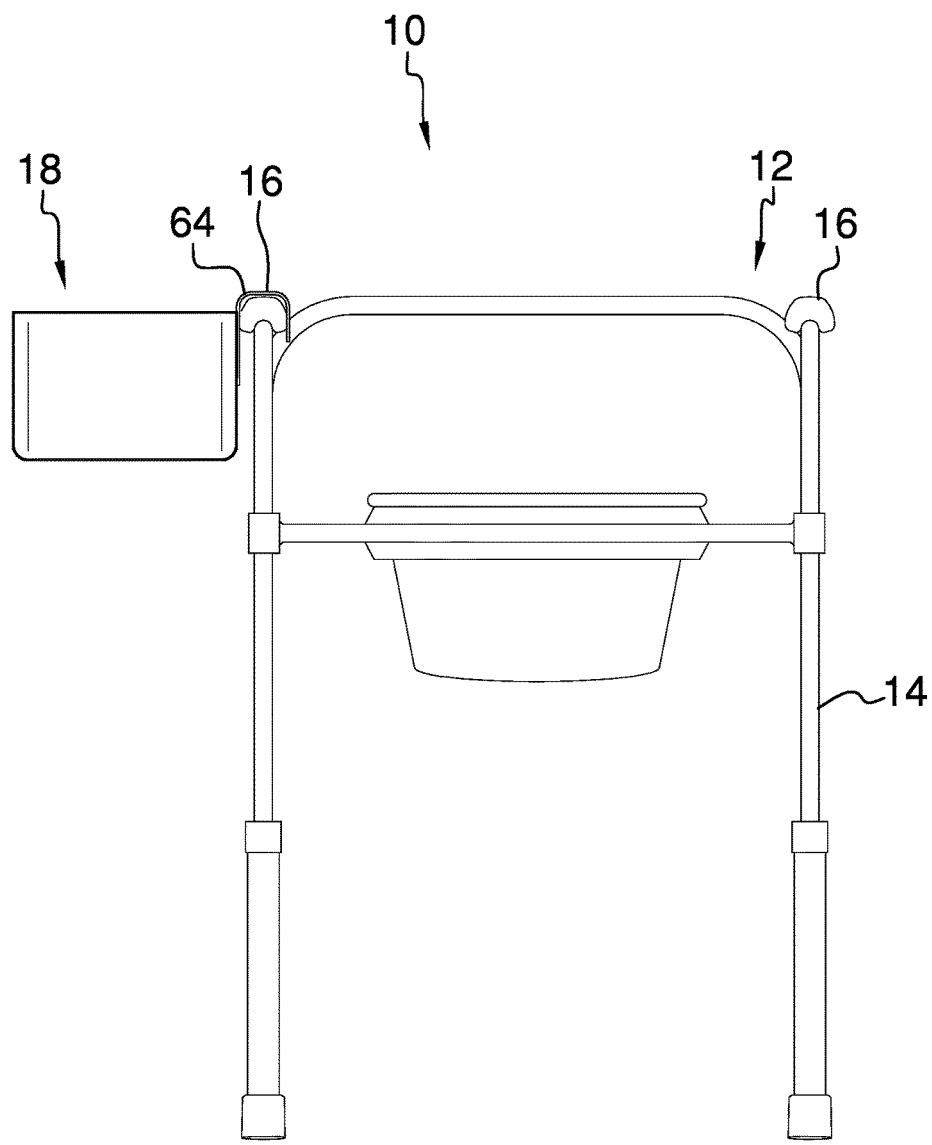
FIG. 4 is a perspective in-use view of an embodiment of the disclosure.

With reference now to the drawings, and in particular to FIGS. 1 through 4 thereof, a new caddy device embodying the principles and concepts of an embodiment of the disclosure and generally designated by the reference numeral 10 will be described.

As best illustrated in FIGS. 1 through 4, the storage caddy system 10 generally comprises a portable toilet 12 that is selectively mounted for defecation and urination. The portable toilet 12 has a frame 14 and the frame 14 has a pair of arm rests 16. Additionally, the portable toilet 12 may be mounted by a physically disabled user thereby facilitating the physically disabled user to defecate and urinate. The portable toilet 12 may be a portable handicapped toilet of any conventional design.

A caddy 18 is provided and the caddy 18 is removably coupled to the portable toilet 12. The caddy 18 is positioned on a selected one of the arm rests 16 such that the caddy 18 is accessible during defecation and urination. Toiletry items 20, such as toilet paper 44, wipes and other toiletry items, are selectively positioned in the caddy 18. Thus, the toiletry items 20 are accessible to the physically disabled user when the physically disabled user mounts the portable toilet 12.

The caddy 18 has a bottom wall 22 and a perimeter wall 24 extending upwardly therefrom. The perimeter wall 24 has a distal edge 26 with respect to the bottom wall 22 to define an opening 28 into the caddy 18. Additionally, the perimeter wall 24 has a first lateral side 30, a second lateral side 32, a back side 34, an inwardly facing surface 36 and an outwardly facing surface 38. The bottom wall 22 has a top surface 40. The caddy 18 may have a length ranging between approximately 30.0 cm and 35.0 cm, a width ranging between approximately 22.0 cm and 25.0 cm and a height ranging between approximately 15.0 cm and 20.0 cm.

A box 42 is provided and the box 42 is positioned within the caddy 18. The box 42 is elongated to contain a roll of toilet paper 44. The box 42 extends upwardly from the top surface 40 of the bottom wall 22 and the box 42 is centrally positioned in the caddy 18. The box 42 has a first sidelong wall 46, a second sidelong wall 48 and an outside surface 50. Moreover, the box 42 is elongated between the first 46 and second 48 sidelong walls.

A pair of dividers 52 is provided and each of the dividers 52 extends upwardly from the top surface 40 of the bottom wall 22. The pair of dividers 52 includes a first divider 54 and a second divider 56. The first divider 54 extends between the outside surface 50 corresponding to the first sidelong wall 46 and the inwardly facing surface 36 corresponding to the first lateral side 30. The second divider 56 extends between the outside surface 50 corresponding to the second sidelong wall 48 and the inwardly facing surface 36 corresponding to the second lateral side 32.

Each of the first 54 and second 56 dividers is centrally positioned on the box 42. Additionally, each of the first 54 and second 56 dividers defines a first space 58 and a second space 60 in the caddy 18. The toiletry items 20 may be positioned in each of the first 54 and second 60 spaces. The first space 58 may extend along a front side 62 of the caddy 18 and the second space 60 may extend along the back side 34 of the caddy 18.

A saddle 64 is provided and the saddle 64 is coupled to the caddy 18. The saddle 64 receives the selected arm rest 16 such that the caddy 18 is removably retained on the selected arm rest 16. The saddle 64 has a central portion 66 extending between a first outward portion 68 and a second outward portion 70 to define a gap 72 between the first outward portion 68 and the second outward portion 70. The first outward portion 68 is coupled to the outwardly facing surface 38 corresponding to the back side 34 of the caddy 18. The selected arm rest 16 is positioned in the gap 72 and the saddle 64 frictionally engages the selected arm rest 16. Additionally, the perimeter wall 24 of the caddy 18 rests against the frame 14 of the portable toilet 12 when the saddle 64 is positioned on the selected arm rest 16.

In use, the portable toilet 12 is positioned at a location that is easily accessible to the physically disabled user. The toiletry items 20 are positioned in the caddy 18 and the toilet paper 44 is positioned in the box 42. In this way each of the toiletry items 20 and the toilet paper 44 are accessible to the physically disabled user when the physically disabled user defecates and urinates. Thus, the physically disabled user is facilitated to clean themselves without assistance after defecation and urination. In this way the physically disabled user's self esteem and sense of independence are enhanced with respect to defection and urination.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A storage caddy system comprising:
   a portable toilet being configured to be mounted for defecation and urination, said portable toilet having a frame, said frame having a pair of arm rests;
   a caddy being removably coupled to said portable toilet wherein said caddy is configured to contain toiletry items, said caddy being positioned on a selected one of said arm rests wherein said caddy is configured to be accessible during defecation and urination;
   a box being positioned within said caddy, said box being elongated wherein said box is configured to contain a roll of toilet paper; and
   a saddle being coupled to said caddy, said saddle receiving said selected arm rest such that said caddy is removably retained on said selected arm rest.

2. The assembly according to claim 1, wherein said caddy has a bottom wall and a perimeter wall extending upwardly therefrom, said perimeter wall having a distal edge with respect to said bottom wall to define an opening into said caddy, said perimeter wall having a first lateral side, a second lateral side, a back side, an inwardly facing surface and an outwardly facing surface, said bottom wall having a top surface.

3. The assembly according to claim 2, further comprising said box extends upwardly from said top surface of said bottom wall, said box being centrally positioned in said caddy, said box having a first sidelong wall, a second sidelong wall and an outside surface.

4. The assembly according to claim 2, further comprising a pair of dividers, each of said dividers extending upwardly from said top surface of said bottom wall.

5. The assembly according to claim 4, wherein:
   said box has a first sidelong wall, a second sidelong wall and an outside surface; and
   said pair of dividers includes a first divider and a second divider, said first divider extending between said outside surface corresponding to said first sidelong wall and said inwardly facing surface corresponding to said first lateral side, said second divider extending between said outside surface corresponding to said second sidelong wall and said inwardly facing surface corresponding to said second lateral side, each of said first and second dividers being centrally positioned on said box.

6. The assembly according to claim 5, wherein each of said first and second dividers defines a first space and a second space in said caddy wherein each of said first space and said second space is configured to contain the toiletry items.

7. The assembly according to claim 2, wherein said saddle has a central portion extending between first outward portion and a second outward portion to define a gap between said first outward portion and said second outward portion, said first outward portion being coupled to said outwardly facing surface corresponding to said back side, said selected arm rest being positioned in said gap having said saddle frictionally engaging said selected arm rest.

8. A storage caddy system comprising:
   a portable toilet being configured to be mounted for defecation and urination, said portable toilet having a frame, said frame having a pair of arm rests;
   a caddy being removably coupled to said portable toilet wherein said caddy is configured to contain toiletry items, said caddy being positioned on a selected one of said arm rests wherein said caddy is configured to be accessible during defecation and urination, said caddy having a bottom wall and a perimeter wall extending upwardly therefrom, said perimeter wall having a distal edge with respect to said bottom wall to define an opening into said caddy, said perimeter wall having a first lateral side, a second lateral side, a back side, an inwardly facing surface and an outwardly facing surface, said bottom wall having a top surface;

a box being positioned within said caddy, said box being elongated wherein said box is configured to contain a roll of toilet paper, said box extending upwardly from said top surface of said bottom wall, said box being centrally positioned in said caddy, said box having a first sidelong wall, a second sidelong wall and an outside surface;

a pair of dividers, each of said dividers extending upwardly from said top surface of said bottom wall, said pair of dividers including a first divider and a second divider, said first divider extending between said outside surface corresponding to said first sidelong wall and said inwardly facing surface corresponding to said first lateral side, said second divider extending between said outside surface corresponding to said second sidelong wall and said inwardly facing surface corresponding to said second lateral side, each of said first and second dividers being centrally positioned on said box, each of said first and second dividers defining a first space and a second space in said caddy wherein each of said first space and said second space is configured to contain the toiletry items; and a saddle being coupled to said caddy, said saddle receiving said selected arm rest such that said caddy is removably retained on said selected arm rest, said saddle having a central portion extending between first outward portion and a second outward portion to define a gap between said first outward portion and said second outward portion, said first outward portion being coupled to said outwardly facing surface corresponding to said back side, said selected arm rest being positioned in said gap having said saddle frictionally engaging said selected arm rest.

\* \* \* \* \*